United States Patent
Beghini et al.

(10) Patent No.: US 6,814,496 B2
(45) Date of Patent: Nov. 9, 2004

(54) SUSPENSION THRUST BEARING WITH RETAINING MEANS

(75) Inventors: Eric Beghini, La Membrolle sur Choisille (FR); Christophe Houdayer, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 10/094,867

(22) Filed: Mar. 12, 2002

(65) Prior Publication Data
US 2002/0136477 A1 Sep. 26, 2002

(30) Foreign Application Priority Data
Mar. 21, 2001 (FR) .............................. 01 03827

(51) Int. Cl.[7] .............................................. F16C 19/30
(52) U.S. Cl. ...................... 384/617; 384/607; 384/611; 384/615
(58) Field of Search ............................... 384/609, 611, 384/613–615, 617, 618, 620–622; 267/220, 221, 170, 179, 286; 280/124.145, 124.147, 124.155, 124.179

(56) References Cited

U.S. PATENT DOCUMENTS

| 3,972,574 A | * | 8/1976 | Pitner ........................ 384/621 |
| 4,462,608 A | | 7/1984 | Lederman |
| 4,497,523 A | * | 2/1985 | Lederman .................... 384/615 |
| 4,566,812 A | * | 1/1986 | Takei et al. ................. 384/484 |
| 4,699,530 A | * | 10/1987 | Satoh et al. ................ 384/609 |
| 4,995,737 A | | 2/1991 | Moller et al. |
| 5,110,223 A | * | 5/1992 | Koch et al. ................. 384/620 |
| 5,454,585 A | * | 10/1995 | Dronen et al. ........ 280/124.147 |
| 6,257,605 B1 | * | 7/2001 | Zernickel et al. ..... 280/124.147 |
| 6,267,512 B1 | | 7/2001 | Beghini et al. |

FOREIGN PATENT DOCUMENTS

| EP | 0 390 331 | 10/1990 |
| EP | 0 561 704 | 9/1993 |
| FR | 2 665 494 | 2/1992 |
| FR | 2 779 096 | 12/1999 |

OTHER PUBLICATIONS

International Search Report dated Nov. 29, 2001.

\* cited by examiner

Primary Examiner—Thomas R. Hannon
(74) Attorney, Agent, or Firm—Smith, Gambrell & Russell

(57) ABSTRACT

A suspension thrust bearing including a first race, a second race, a row of rolling bodies disposed between the two races, a first cap 13 in contact with the first race, and a first cup 4 in contact with the first cap 13. The first cap 13 includes integral axial retention means for retaining the first cup 4.

21 Claims, 5 Drawing Sheets

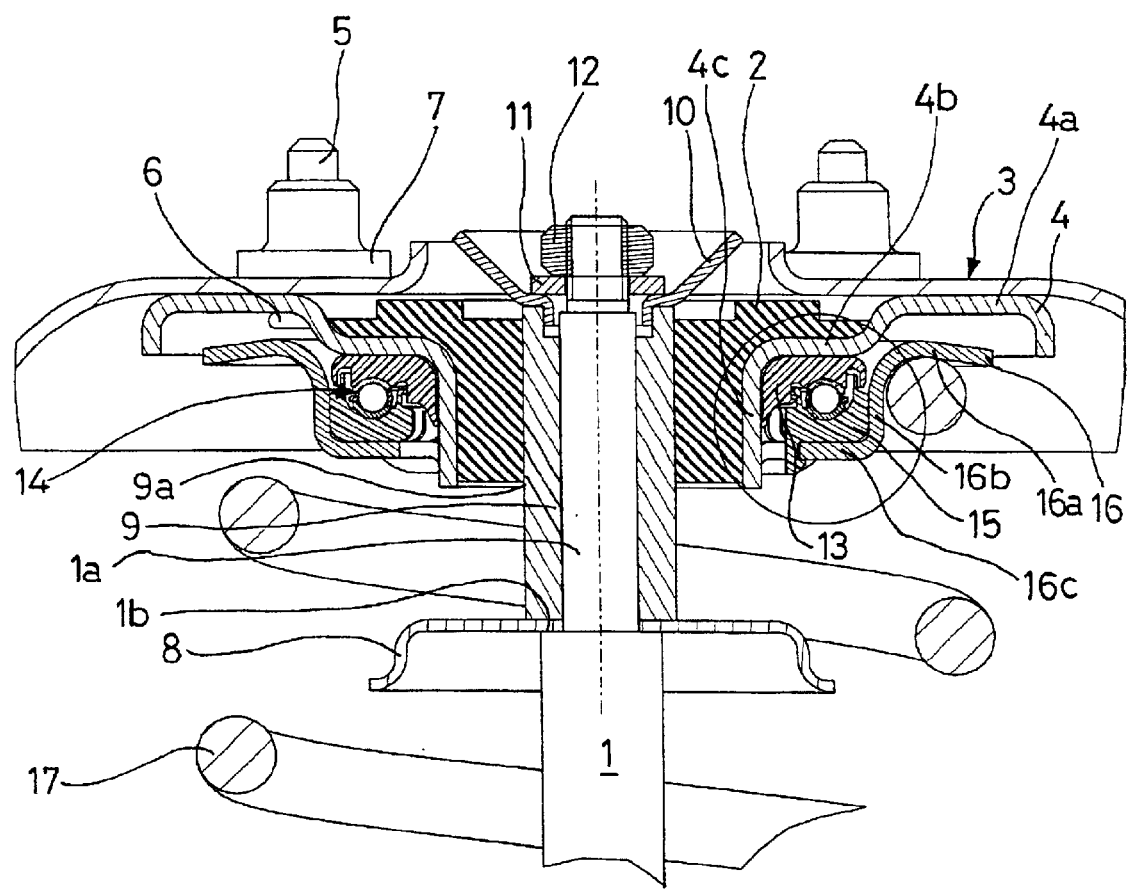
FIG_1

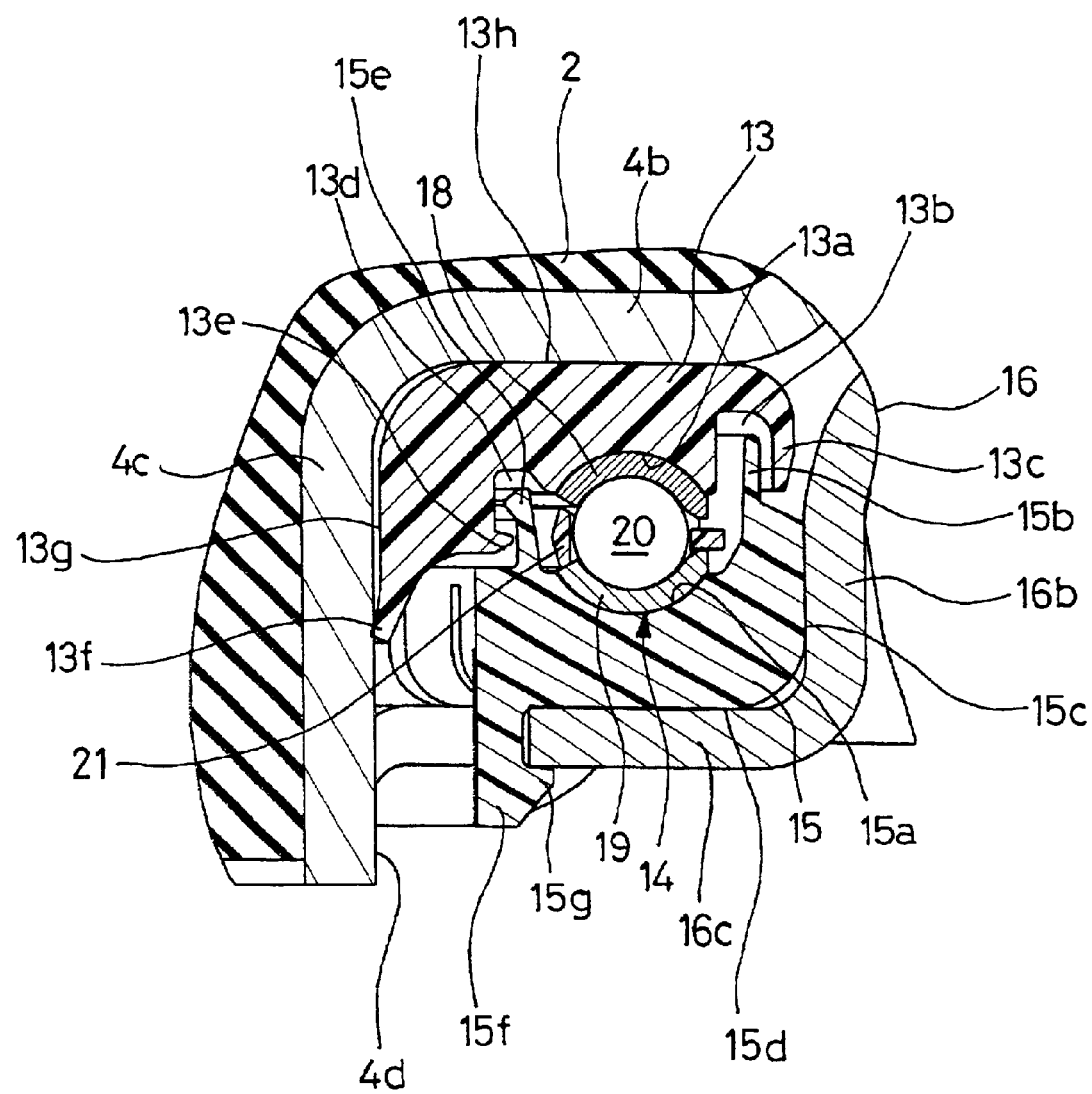

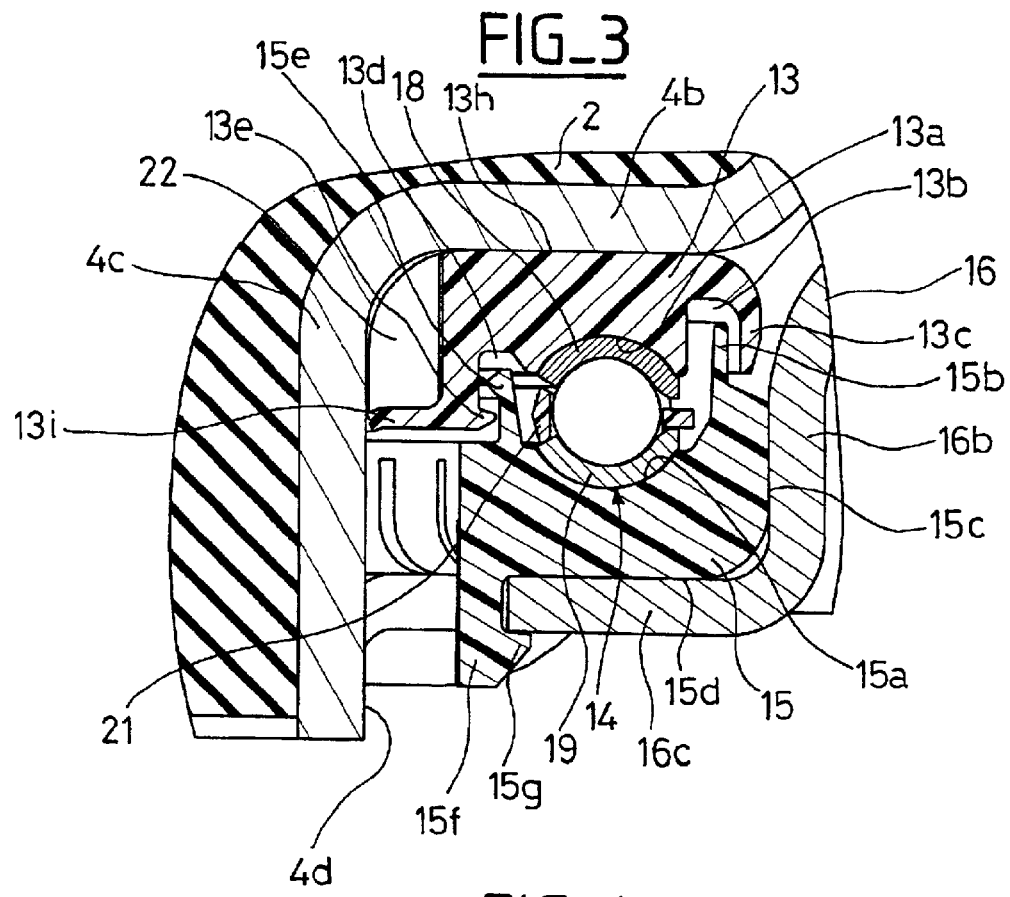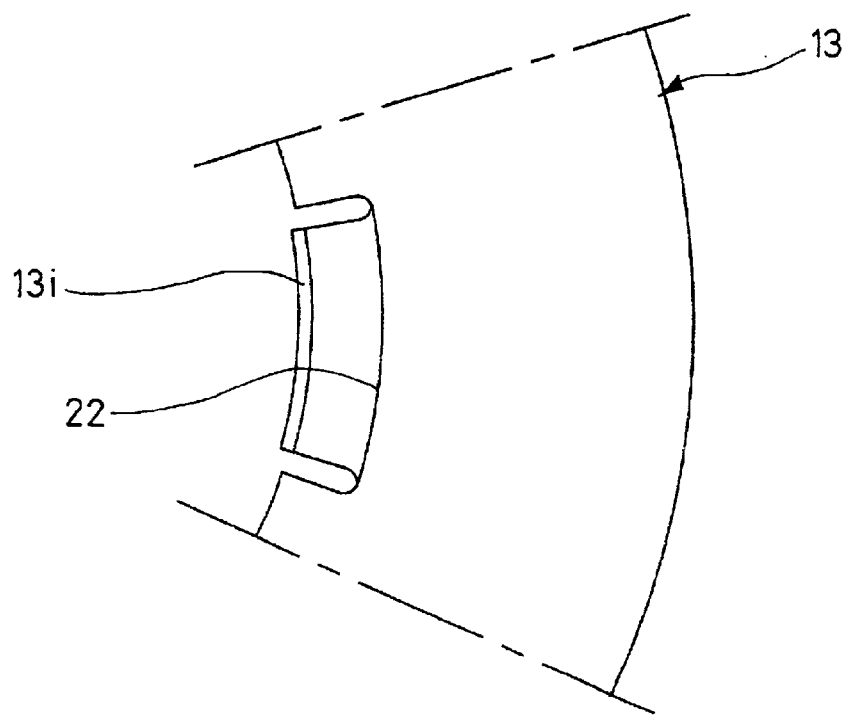

FIG_5
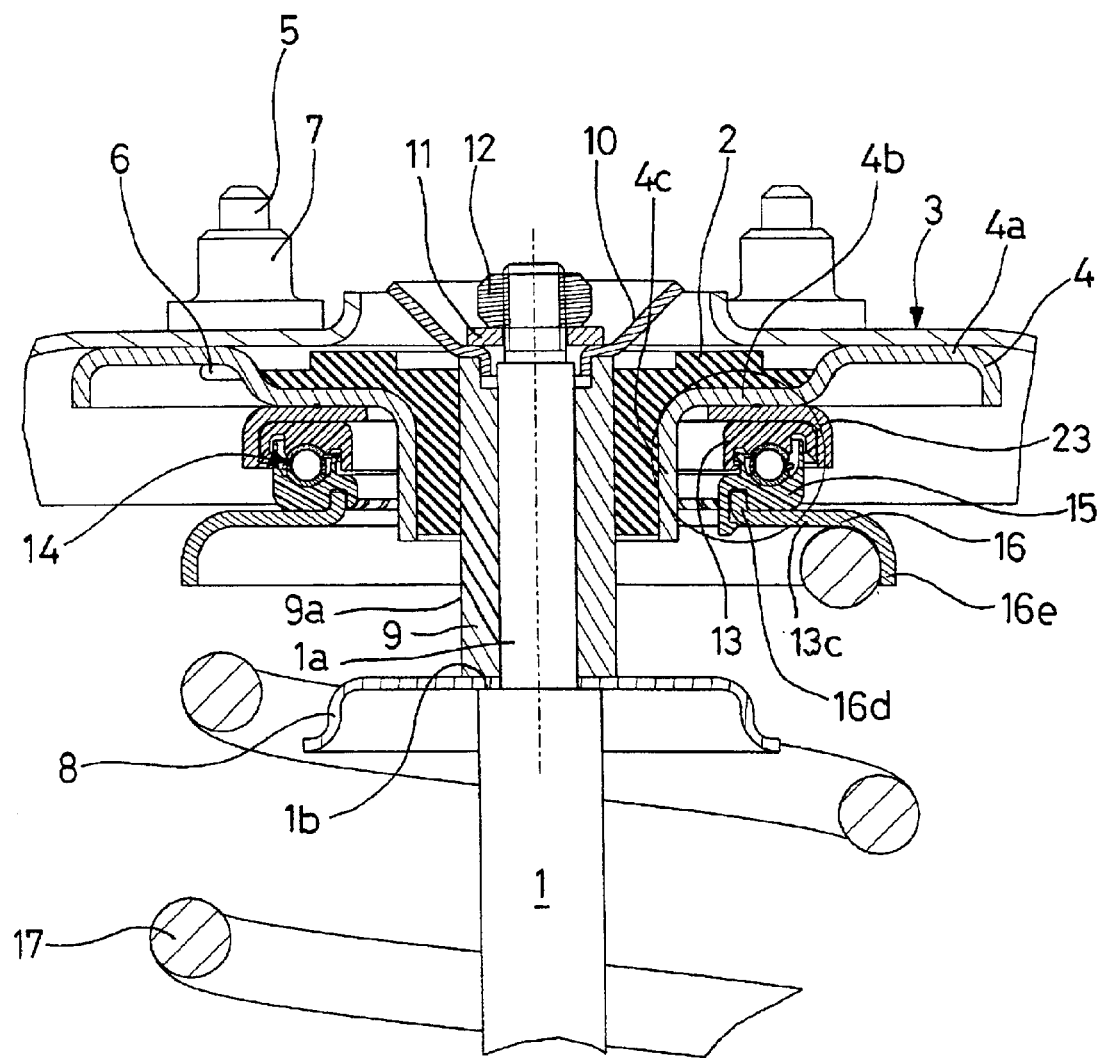

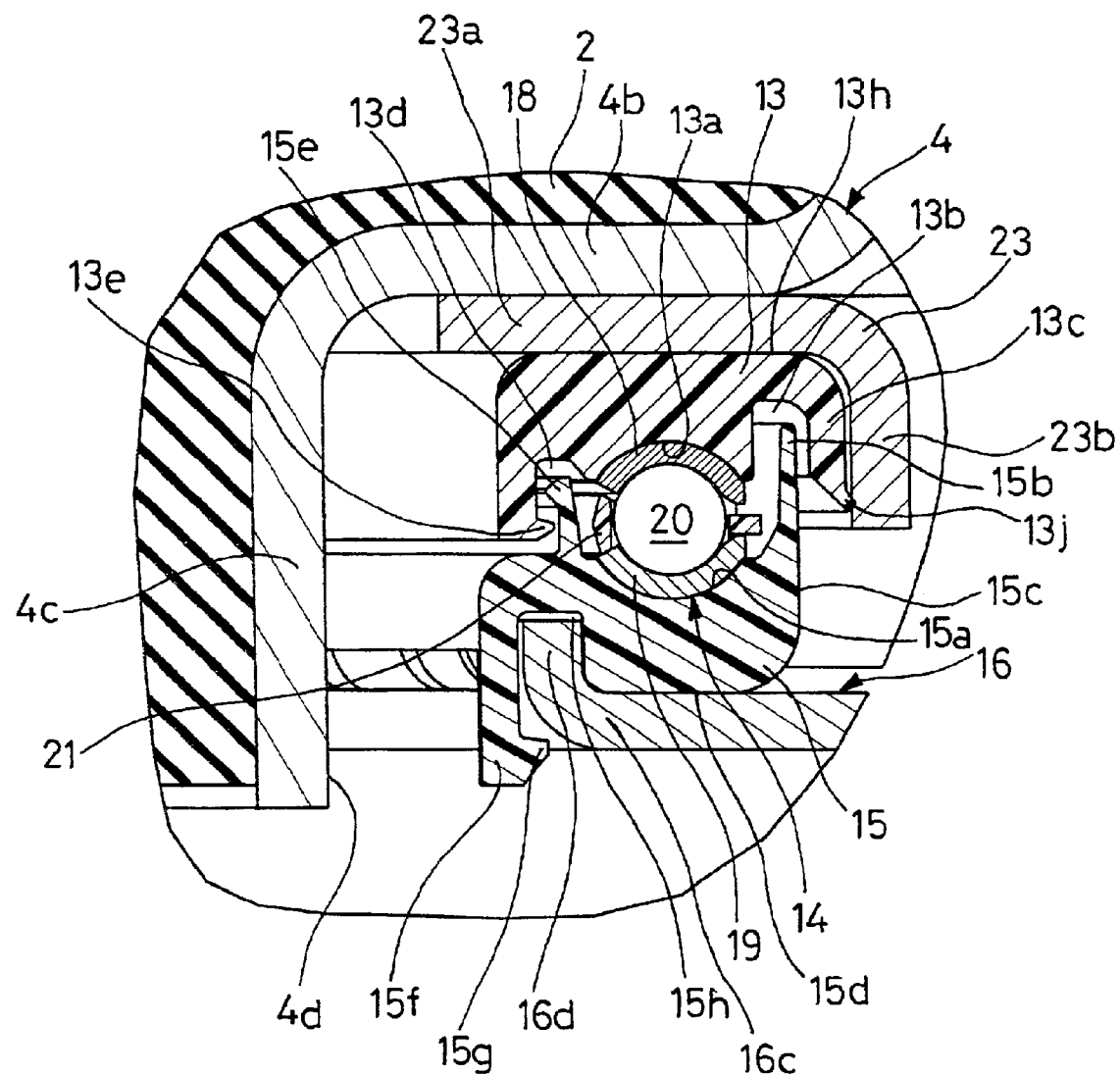
FIG_6

US 6,814,496 B2

SUSPENSION THRUST BEARING WITH RETAINING MEANS

FIELD OF THE INVENTION

The present invention relates to suspension thrust bearings used in particular in telescopic suspension arms of steered wheels of automobile vehicles.

DESCRIPTION OF THE PRIOR ART

A suspension thrust bearing generally includes a top race and a bottom race between which are disposed rolling bodies in the form of balls or rollers.

The invention relates more particularly to suspension thrust bearings including at least one synthetic material cap in contact with one of the two races of the bearing.

The suspension thrust bearing is disposed at the top of the suspension arm, between a generally metallic bottom cup, serving also as a seat for a suspension spring, and a top member fastened to the body of the vehicle. This is known in the art. The suspension spring is installed around the piston rod of the damper, the end of which is fastened to an elastic support block. The suspension thrust bearing allows rotation between the bearing cup of the spring, which can rotate, and the elastic support block, which is fixed to the body of the vehicle. The suspension thrust bearing also transmits axial forces between the spring and the body of the vehicle. Relative angular movement between the spring bearing cup and the elastic support block results from turning of the steered wheel and/or compression of the suspension spring. The top race of the bearing can be equipped with a metal band bent over said race and clamped to said top member fastened to the body of the vehicle. See French patent No. 2 665 494, for example. However, it is difficult to control the clamping of the band into the housing of the top member because of manufacturing tolerances.

A device employing one or two synthetic material caps can be used, as described in the document U.S. Pat. No. 4,995,737 or EP-A-390 331, each cap capping a race and having axial retaining means cooperating with the other cap. The caps are generally made from synthetic material charged with glass fibers to give them the necessary strength and stiffness. Synthetic material caps transmit and distribute forces between the bearing and the adjacent members. They also standardize the dimensions of the bearing races, i.e. they enable the same races to be used for different applications merely by modifying the external geometry of the caps.

The invention proposes a suspension thrust bearing forming a compact assembly adapted to be easily manipulated and transported without risk of accidental loss of any of its components.

SUMMARY OF THE INVENTION

The suspension thrust bearing conforming to one aspect of the invention includes a first race, a second race, a row of rolling bodies disposed between the two races, a first cap in contact with the first race, and a first cup in contact with the first cap. The first cap includes integral axial retention means for retaining the first cup.

This provides a simple subassembly, consisting of the suspension thrust bearing and the top cup, that cannot come apart while it is being manipulated and is easy to manipulate, transport and finally mount on the vehicle.

In one embodiment of the invention the axial retention means of the first cap include an annular lip force-fitted over a cylindrical outside surface or a bore of the first cup.

In another embodiment of the invention the axial retention means of the first cap include a plurality of tongues interfering with a cylindrical outside surface or a bore of the first cup.

The bearing advantageously includes a second cap in contact with the second race. The first cap includes axial fastening means for fastening it to the second cap.

In one embodiment of the invention the axial fastening means of the first cap for fastening it to the second cap include an annular rib and the second cap is adapted to cooperate with the rib, for example another rib of complementary shape.

In one embodiment of the invention the bearing includes a second cap fastened to the second race and a second cup in contact with the second cap. The second cap includes axial fastening means for fastening it to the second cup.

In one embodiment of the invention the axial fastening means of the second cap for fastening it to the second cup include a plurality of hooks interfering with a surface of the second cup.

The first and second races are advantageously made from thin sheet metal. The first and second races can consist of a simple annulus whose cross section is circular-arc-shaped.

A suspension thrust bearing is obtained whose overall size in the axial and radial directions is not changed compared to prior art bearings, which provides an excellent seal and which includes means for fastening its various members together.

The invention will be better understood and other advantages will become apparent on reading the detailed description of a few embodiments provided by way of non-limiting example and shown in the accompanying drawings, in which:

BRIEF DESCRIPTION OF THE DRAWINGS

FIG. 1 is a view in axial section of an assembled suspension thrust bearing;

FIG. 2 shows a detail from FIG. 1;

FIG. 3 shows a variant of FIG. 2;

FIG. 4 shows a detail from FIG. 3;

FIG. 5 shows a variant of FIG. 1; and

FIG. 6 shows a detail from FIG. 5.

DESCRIPTION OF THE PREFERRED EMBODIMENTS

The damper includes a cylinder in which slides a piston whose piston rod 1 is connected at its top end to an elastic support block 2 fastened to a cup 4 fixed to the chassis 3.

The top cup 4 is fixed to the chassis by bolts 5 with heads 6 in contact with the cup 4, the bolts passing through holes in said chassis and cooperating with nuts 7. The cup 4 is of annular shape and has a radial portion 4a in contact with the chassis 3 and terminating at the outside in a substantially cylindrical axial rim. A radial portion 4b of smaller diameter than the portion 4a is connected to the latter by an oblique portion so that said radial portion 4b is spaced from the chassis 3, in other words offset axially downward. A cylindrical axial portion 4c originating from the small diameter end of the radial portion 4b is directed away from the chassis 3.

The generally annular elastic support block 2 is molded over the top cup 4 and the cylindrical sleeve 9 mounted on the cylindrical end 1a of the rod 1.

The elastic support block 2 is in contact with the cylindrical portion 4c, the radial portion 4b and part of the oblique portion between the radial portions 4a and 4b. The elastic support block 2 is also in contact with a portion of the external cylindrical surface 9a of the sleeve 9.

The top end of the piston rod 1 has a portion 1a of smaller diameter than the remainder of the rod 1, from which it is separated by an annular radial surface 1b. An abutment washer 8 in the form of an annular cup is mounted around the end 1a of the rod 1 at the damper cylinder end and in contact with the radial surface 1b. The abutment washer provides a seating for an elastic buffer (not shown) serving as an end of travel abutment in the event of extreme and exceptional displacement of the suspension. Above the sleeve 9 are a generally frustoconical cup 10, a washer 11 and a nut 12 cooperating with a threaded portion of the top end 1a to fasten together the abutment washer 8, the sleeve 9 and the cup 10.

There are further provided a top cap 13, a thrust bearing 14, and a bottom cap 15, these members being seen more clearly in FIG. 2, as well as a bottom cup 16 and a suspension coil spring 17.

The bottom cup 16 is of annular shape and has a radial or slightly frustoconical portion 16a of large diameter offering a contact surface for the top end of the spring 17, a substantially cylindrical intermediate portion 16b originating from the small diameter end of the portion 16a and directed downward, away from the chassis 3, and offering a centering surface to the spring 17, and another radial portion 16c connected to the cylindrical portion 16b and directed inward. The cups 4 and 16 are generally made of sheet metal and the caps 13 and 15 are generally made of a synthetic material.

The top cap 13 is in contact with the bottom surface of the radial portion 4b of the top cup 4 and with the cylindrical outside surface 4d of the cylindrical portion 4c of said cup 4. To be more specific, the top cap 13 has a toroidal concave surface 13a, which is open on the side facing away from the chassis 3, and an annular groove 13b radially outside the concave surface 13a and delimited by an axial rim 13c formed at the large diameter end of the cap 13 and extending downward, away from the chassis 3. On the opposite side the top cap 13 has a groove 13d substantially adjacent the concave surface 13a, and then an annular rib 13e extending radially outward, and finally an oblique lip 13f coming into contact with the cylindrical surface 4d of the portion 4c of the top cup 4. The top cap 13 and the top cup 4 are fastened together by said lip 13f, which forms retaining means with a clamping action. In the free state, the lip 13f has a diameter slightly less than the diameter of the cylindrical outside surface 4d. The cap 13 includes a bore 13g and has a radial top surface 13h in contact with the radial portion 4b of the top cup 4.

The bearing 14 includes a top race 18 of thin sheet metal having an annular shape of toroidal cross section. The top race 18 is in contact with and espouses the shape of the toroidal concave surface 13a of the top cap 13. The bearing further includes a bottom race 19 of similar shape to the top race 18, which is particularly economical in that the bearing comprises two strictly identical races mounted face-to-face. Between the top race 18 and bottom race 19 is a row of rolling bodies 20, balls in this instance, and a cage 21 for maintaining the circumferential spacing of the rolling bodies 20.

The bottom cap 15 has a toroidal concave surface 15a of similar shape to the corresponding surface 13a of the top cap 13 and in contact with and espousing the shape of the bottom race 19 of the bearing 14. The top cap 13 and the bottom cap 15 transmit and distribute forces between the races of the bearing 14 and the top cup 4 and the bottom cup 16. The cap 15 also includes an annular rib 15b extending axially upward, i.e. toward the chassis 3, and occupying the groove 13b of the top cap 13, thereby surrounding the bearing 14, and then an outside cylindrical surface 15c in contact with the cylindrical portion 16b of the bottom cup 16, and a bottom radial surface 15d in contact with the radial portion 16c of the bottom cup 16. An annular rib 15e extends axially upward and radially slightly inward, has a diameter less than that of the bearing 14 and is disposed in and projects from the groove 13d of the top cap 13; it is adapted to interfere diametrally with the rib 13e so that the ribs 13e and 15e assure mutual retention in the axial direction of the top cap 13 and the bottom cap 15.

In other words, the rib 15e also extends slightly radially inward in order to achieve said diametral interference with the rib 13e. The bottom cap 15 is completed by a plurality of hooks 15f extending axially downward and having an end 15g adapted to interfere with the small-diameter free end of the radial portion 16c of the bottom cup 16 to fasten together axially the bottom cap 15 and the bottom cup 16.

The axial rim 13c and the annular rib 15b form a labyrinth seal preventing penetration of water or pollutants into the suspension thrust bearing. Similarly the rib 13e forms a labyrinth seal with the rib 15e.

What is more, the external cylindrical surface 15c of the bottom cap 15 can be provided with an annular bead extending outward and having a diameter in the free state greater than that of the bore in the cylindrical portion 16b of the bottom cup 16 to assure, in addition to the hooking action of the hooks 15f, a force-fitting action and a centering effect through contact between the bead and the bore of said cylindrical portion 16b of the bottom cup 16.

Accordingly, the bearing 14 equipped with the top cap 13 and bottom cap 15 forms a subassembly whose component parts cannot be lost accidentally thanks to the axial fastening effect of the diametral interference between the rib 15e of the bottom cap 15 and the rib 13e of the top cap 13. Said subassembly, completed by the bottom cup 16, is again protected against loss of components by the axial and radial fastening effect of the hooks 15f of the bottom cap 15 cooperating with the bottom surface of the radial portion 16c of the bottom cup 16 and thanks to a bead (not shown) being in contact with a bore (not shown) in the cylindrical portion 16b of the bottom cup 16.

Finally, the subassembly formed by the bearing 14, the top cap 13 and the bottom cap 15, and where applicable the bottom cup 16, forms when mounted in the top cup 4 an assembly protected against loss of components during manipulation preceding final mounting. The top cup 4 and the sleeve 9 will be fastened to the elastic support block 2 that can be molded onto said top cup 4 and to the sleeve 9 disposed inside the elastic support block 2.

The invention therefore provides a complete subassembly, including the thrust bearing, the top cup and the bottom cup on which the spring bears, that can be easily manipulated, transported and finally mounted on the vehicle.

The embodiment shown in FIGS. 3 and 4 is similar to that shown in FIGS. 1 and 2 except that the lip 13f of the cap 13 is replaced by a row of tongues 13i disposed in a circular fashion and extending radially inward so as to come into contact with the cylindrical outside surface 4d of the cylindrical portion 4c of the top cup 4. A recess 22 can be provided above each tongue 13i. The tongues 13i are inclined slightly downward, so that they can flex when the top cap 13 is fitted over the top cup 4, and braced against the cup 4 in the opposite direction, so preventing axial separation of the top cap 13 and the top cup 4.

In the embodiment shown in FIGS. 5 and 6, the top cup 4 further includes an intermediate annular member 23, made of sheet metal, for example, fixed to the radial portion 4b, for example welded to it, and having an L-shaped cross section with a radial portion 23a in contact with the radial portion 4b and a cylindrical portion 23b extending axially downward from the large diameter end of the radial portion 23a. The bottom free edge of the rim 13c of the top cap 13 includes an annular lip 13j in contact with the bore in the cylindrical portion 23b of the member 23 of the top cup 4. The top surface 13h of the top cap 13 is in contact with the radial portion 23a of the member 23. The axial fastening between these members is assured by the contact of the lip 13j on the bore of the cylindrical portion 23b.

Here the bottom cup 16 has a cylindrical rim 16d directed upward, extending from the small-diameter end of the radial portion 16c, and disposed in a groove 15h in the bottom cap 15. The groove 15h is radially between the hooks 15f and the radial surface 15d. A cylindrical portion 16e extends downward from the large-diameter end of the radial portion 16c. The spring 17 bears on the radial portion 16c and is centered by the cylindrical portion 16e.

The invention provides a complete subassembly including the thrust bearing, i.e. the bearing 14 plus the top cap 13 and the bottom cap 15, the bottom cup 15 and a top block formed by the top cup 4, where applicable equipped with the supplementary member 23, and the elastic support block 2.

What is claimed is:

1. A suspension thrust bearing including a first race, a second race, a row of rolling bodies disposed between said two races, a top cap comprising a toroidal concave surface in contact with said first race, said first race being disposed in said ton cap, and a metallic top cup in contact with said top cap, the top cap comprising an axial retention means with the top cup, said axial retention means being integral with the top cap.

2. The bearing claimed in claim 1, wherein said axial retention means of said top cap include an annular lip force-fitted over a cylindrical outside surface or a bore of said top cup.

3. The bearing claimed in claim 1, wherein said axial retention means of said top cap include a plurality of tongues interfering with a cylindrical outside surface or a bore of said top cup.

4. The bearing claimed in claim 1, which includes a bottom cap in contact with said second race, said top cap including axial fastening means for fastening it to said bottom cap.

5. The bearing claimed in claim 4, wherein said axial fastening means of the top cap for fastening it to said bottom cap include an annular rib and said bottom cap is equipped with means adapted to cooperate with said rib.

6. The bearing claimed in claim 1, which includes a bottom cap fastened to said second race and a bottom cup in contact with said bottom cap, and wherein said bottom cap includes axial fastening means for fastening it to said bottom cup.

7. The bearing claimed in claim 6, wherein said axial fastening means of said bottom cap for fastening it to said bottom cup include a plurality of hooks interfering with a surface of the bottom cup.

8. The bearing claimed in claim 1, wherein said first and second races are made of thin sheet metal.

9. A suspension thrust bearing including a first race, a second race, a row of rolling bodies disposed between said two races, a top cap comprising a radial top surface and a toroidal concave surface, said toroidal concave surface being in contact with said first race, said first race being disposed in said top cap, and a metallic top cup in contact with said top cap, the top cap comprising an axial retention means with said top cup, said axial retention means being integral with the top cap.

10. The bearing claimed in claim 9, wherein said axial retention means of said top cap include an annular lip force-fitted over a cylindrical outside surface or a bore of said top cup.

11. The bearing claimed in claim 9, wherein said axial retention means of said top cap include a plurality of tongues interfering with a cylindrical outside surface or a bore of said top cup.

12. The bearing claimed in claim 9, which includes a bottom cap in contact with said second race, said top cap including axial fastening means for fastening it to said bottom cap.

13. The bearing claimed in claim 12, wherein said axial fastening means of the top cap for fastening it to said bottom cap include an annular rib and said bottom cap is equipped with means adapted to cooperate with said rib.

14. The bearing claimed in claim 13, wherein said first and second races are made of thin sheet metal.

15. The bearing claimed in claim 9, which includes a bottom cap fastened to said second race and a bottom cup in contact with said bottom cap, and wherein said bottom cap includes axial fastening means for fastening it to said bottom cup.

16. The bearing claimed in claim 15, wherein said axial fastening means of said bottom cap for fastening it to said bottom cup include a plurality of hooks interfering with a surface of the bottom cup.

17. A suspension thrust bearing including a first race, a second race, a row of rolling bodies disposed between said two races, a top cap comprising a toroidal concave surface in contact with said first race, said first race being disposed in said top cap, a metallic top cup in contact with said top cap and with a chassis, and an elastic support block mounted in the top cup, the top cap comprising an axial retention means with the top cup, said axial retention means being integral with the top cap.

18. The bearing claimed in claim 17, wherein said axial retention means of said top cap include an annular lip force-fitted over a cylindrical outside surface or a bore of said top cup.

19. The bearing claimed in claim 17, wherein said axial retention means of said top cap include a plurality of tongues interfering with a cylindrical outside surface or a bore of said top cup.

20. The bearing claimed in claim 17, which includes a bottom cap fastened to said second race and a bottom cup in contact with said bottom cap, and wherein said bottom cap includes axial fastening means for fastening it to said bottom cup.

21. A suspension thrust bearing including a first race, a second race, a row of rolling bodies disposed between said two races, a top cap comprising a toroidal concave surface in contact with said first race, a bottom cap comprising an annular rib extending upward, said first race being disposed in said top cap, and a metallic top cup in contact with said top cap, the top cap comprising an axial retention means with the top cup, said axial retention means being integral with the top cap, the top cap further comprising an axial rim extending downward, said axial rim and said annular rib forming a chicane seal.

* * * * *